(12) United States Patent
Hamburg

(10) Patent No.: US 7,627,168 B2
(45) Date of Patent: *Dec. 1, 2009

(54) SMART ERASURE BRUSH

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/141,456

(22) Filed: Jun. 18, 2008

(65) Prior Publication Data

US 2008/0317388 A1 Dec. 25, 2008

Related U.S. Application Data

(60) Continuation of application No. 10/903,520, filed on Jul. 30, 2004, now Pat. No. 7,400,763, which is a continuation of application No. 10/162,856, filed on Jun. 4, 2002, now Pat. No. 6,791,573, which is a division of application No. 09/300,088, filed on Apr. 26, 1999, now Pat. No. 6,434,269.

(51) Int. Cl.
*G06K 9/00* (2006.01)

(52) U.S. Cl. ............... 382/163; 345/592; 345/639

(58) Field of Classification Search ......... 382/162–164, 382/173–176, 191, 199, 254, 274, 275, 276, 382/309, 311, 318; 358/1.1, 1.16, 452, 453, 358/464, 538, 537, 517; 345/418, 581, 589, 345/592, 619, 629, 600, 634, 639, 620, 626; 356/237.1, 239.1; 250/330, 341.8; 359/296; 428/532, 543; 427/197, 21; 399/249, 184; 347/99, 101, 179; 106/31.64; 156/62; 342/342, 342/100

See application file for complete search history.

(56) References Cited

U.S. PATENT DOCUMENTS 4,345,313 A 8/1982 Knox (Continued)

FOREIGN PATENT DOCUMENTS

WO WO 96/13006 5/1996

(Continued)

OTHER PUBLICATIONS

Extensis Corporation, Mask Pro 2.0 Reviewer's Guide, http://www.extensis.com/maskpro/pdfs/maskpro_eg.pdf, © 1998, retrieved on Sep. 3, 2002.

*Primary Examiner*—Sheela C Chawan
(74) *Attorney, Agent, or Firm*—Fish & Richardson P.C.

(57) ABSTRACT

Methods and apparatus, including computer program products, for erasing in a digital image. A method includes identifying a plurality of tip regions on the image, establishing an erasure color, and completely erasing pixels in the tip region that have a color matching the erasure color. Pixels having partially matching colors are partially erased and color decontaminated.

27 Claims, 4 Drawing Sheets

U.S. PATENT DOCUMENTS

| | | | |
|---|---|---|---|
| 4,876,533 A * | 10/1989 | Barkans | 345/625 |
| 4,893,181 A | 1/1990 | Yeomans | |
| 5,058,181 A | 10/1991 | Ishihara et al. | |
| 5,182,548 A | 1/1993 | Haeberli | |
| 5,307,452 A | 4/1994 | Hahn et al. | |
| 5,347,620 A | 9/1994 | Zimmer | |
| 5,469,536 A | 11/1995 | Blank | |
| 5,513,991 A | 5/1996 | Reynolds | |
| 5,621,868 A | 4/1997 | Mizutani et al. | |
| 5,630,037 A | 5/1997 | Schindler | |
| 5,719,600 A | 2/1998 | Alcorn | |
| 5,748,776 A | 5/1998 | Yoshida | |
| 5,767,860 A | 6/1998 | Zimmer et al. | |
| 5,835,086 A | 11/1998 | Bradstreet et al. | |
| 5,844,565 A | 12/1998 | Mizutani et al. | |
| 5,847,712 A | 12/1998 | Salesin et al. | |
| 5,974,194 A | 10/1999 | Hirani et al. | |
| 6,011,536 A | 1/2000 | Hertzmann et al. | |
| 6,081,611 A | 6/2000 | Linford et al. | |
| 6,097,853 A | 8/2000 | Gu et al. | |
| 6,141,431 A | 10/2000 | Munetsugu et al. | |
| 6,226,000 B1 | 5/2001 | Richens et al. | |
| 6,304,276 B1 | 10/2001 | Haneda et al. | |
| 6,329,990 B1 | 12/2001 | Silverbrook et al. | |
| 6,434,269 B1 | 8/2002 | Hamburg | |
| 6,445,816 B1 | 9/2002 | Pettigrew | |
| 7,400,763 B2 * | 7/2008 | Hamburg | 382/163 |

FOREIGN PATENT DOCUMENTS

WO     WO 98/11510     3/1998

* cited by examiner

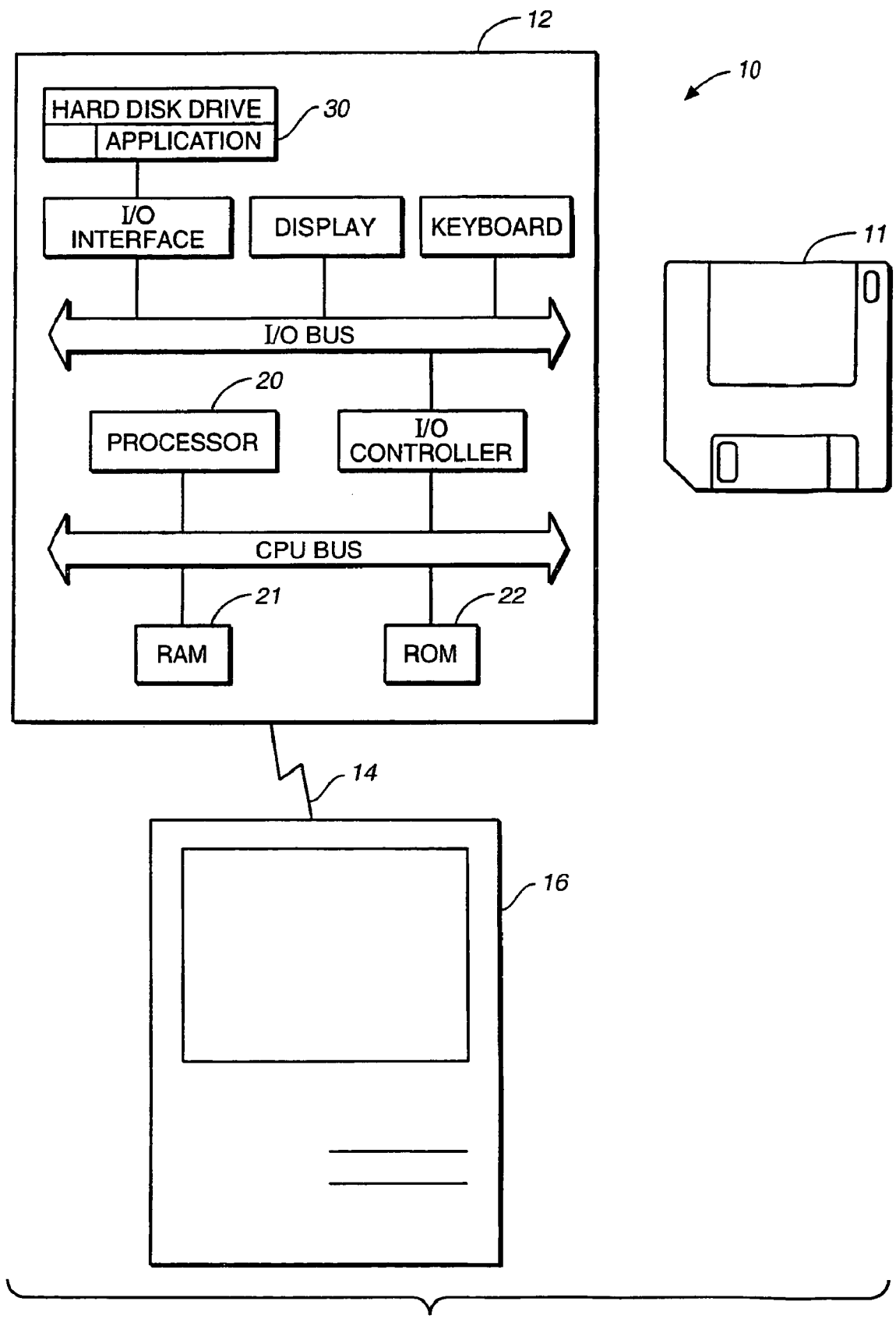
FIG._1

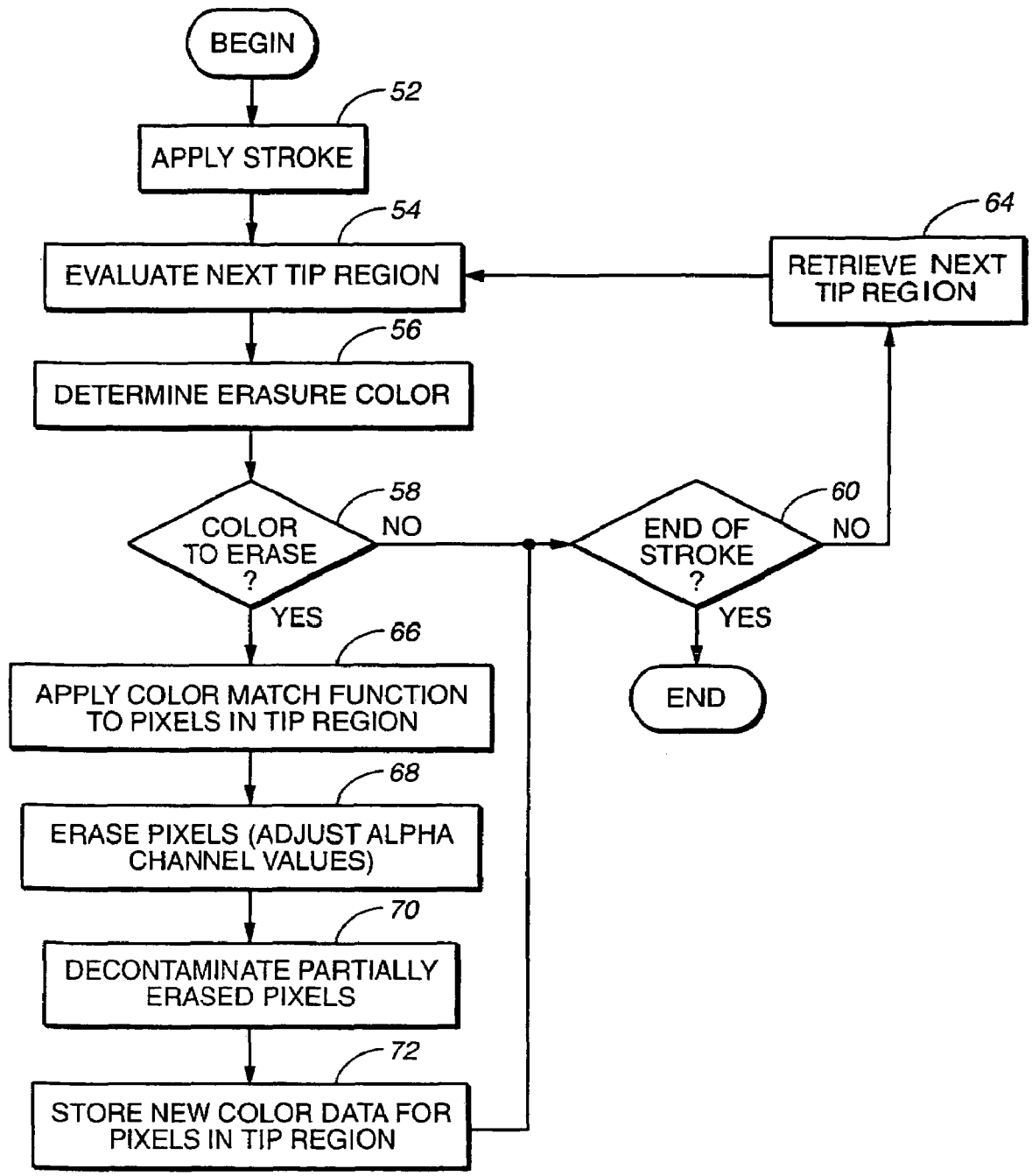
FIG._2

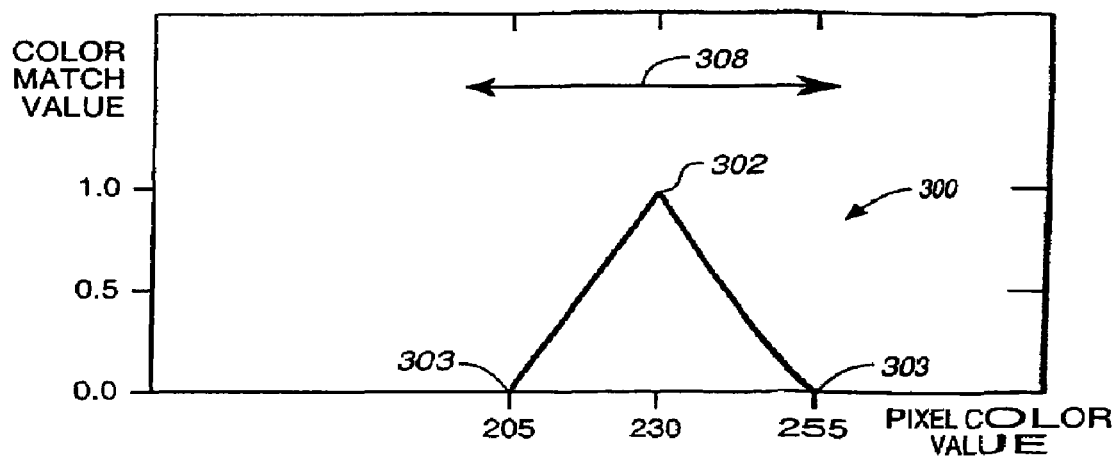
FIG._3a
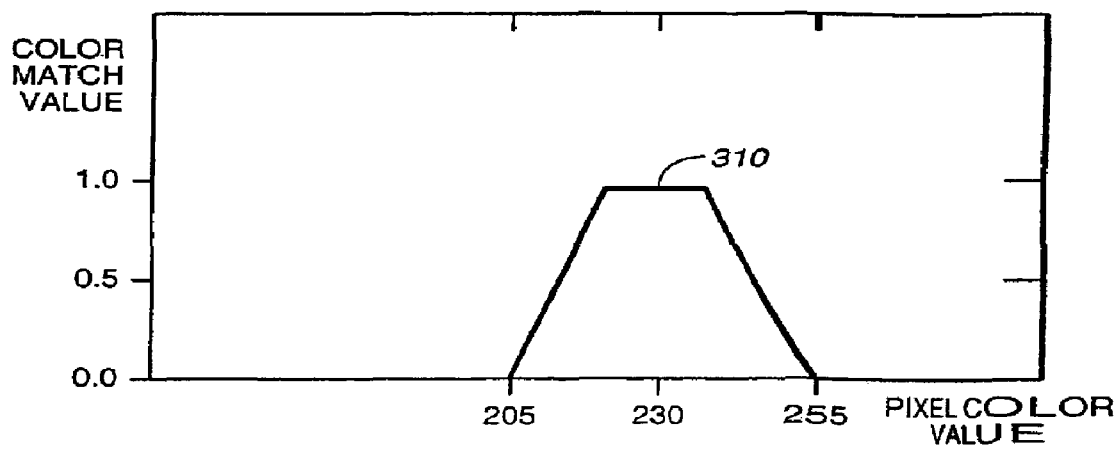
FIG._3b
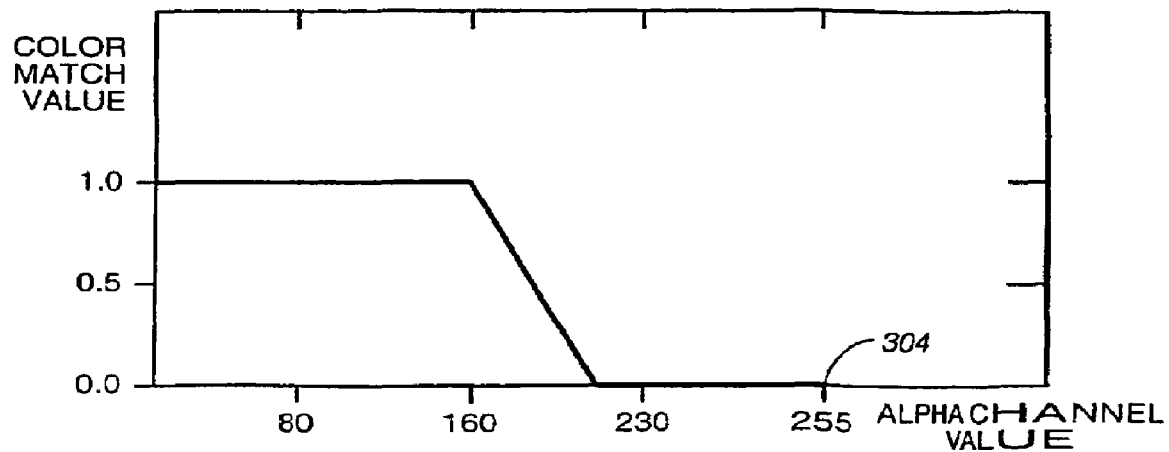
FIG._3c

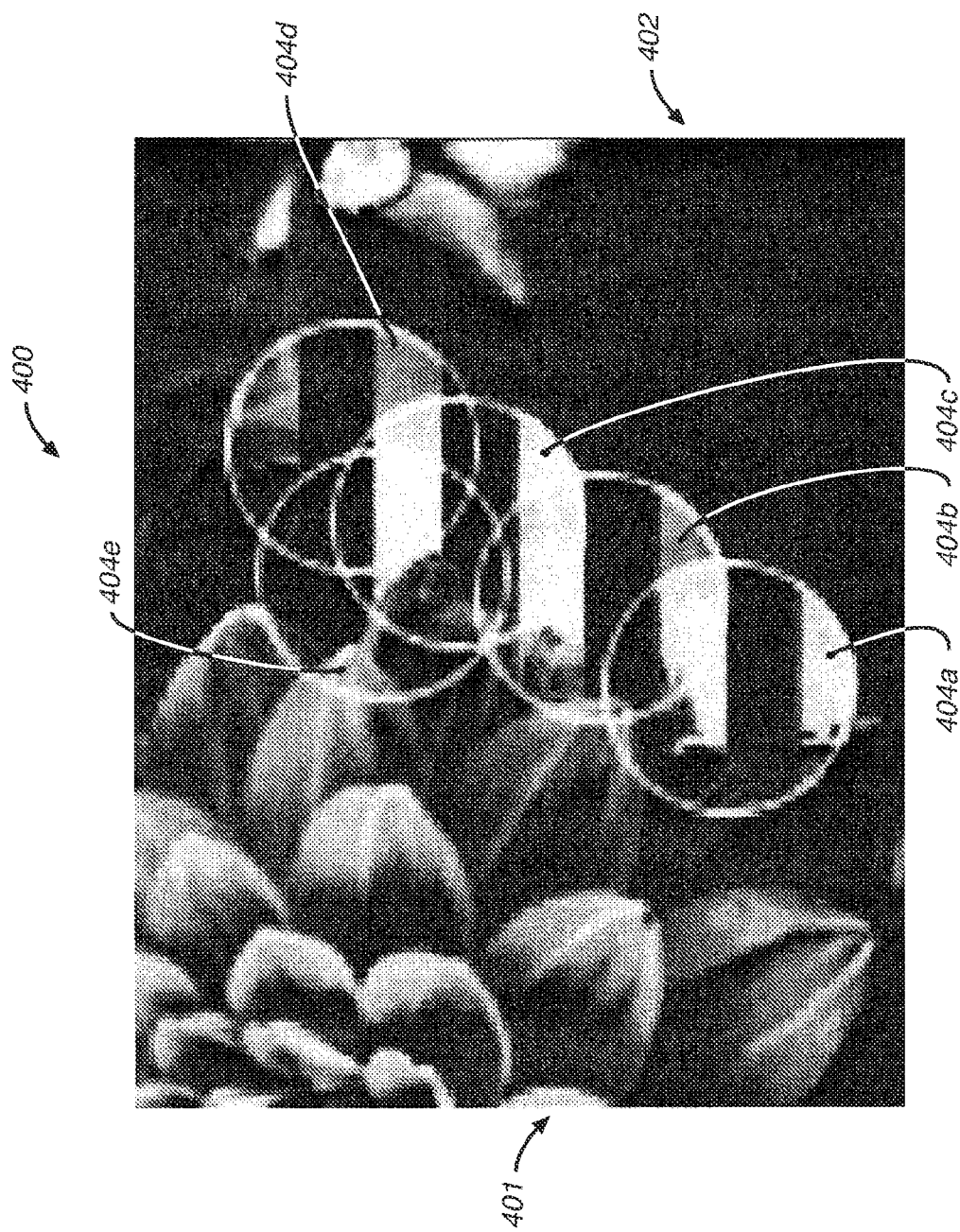
FIG._4

SMART ERASURE BRUSH

CROSS-REFERENCE TO RELATED APPLICATIONS

This is a continuation of U.S. Ser. No. 10/903,520, filed Jul. 30, 2004 now U.S. Pat. No. 7,400,763, which is a continuation of U.S. Ser. No. 10/162,856, filed Jun. 4, 2002, now U.S. Pat. No. 6,791,573, issued Sep. 14, 2004, which is a divisional of U.S. application Ser. No. 09/300,088, filed Apr. 26, 1999, now U.S. Pat. No. 6,434,269, issued Aug. 13, 2002, the entire contents of which are hereby incorporated by reference.

FILED OF THE INVENTION

The present invention relates generally to processing of digital images, to erase a feature from a digital image.

BACKGROUND OF THE INVENTION

A common task in the manipulation of digital images is the removal of one or more objects from a scene. Simple examples of this include: the removal of one or more background objects, leaving just a foreground object(s); the removal of a foreground object from a background scene; and, for composited images produced from multiple layers of image data, the removal of an object belonging to an original layer from the overall composite. The removal process is typically a difficult task for several reasons. A pixel at an edge of an object may have contributions from both the foreground and the background. The color of the pixel is consequently a blend of the two regions, making the removal of only one of the regions difficult. Even for an object that does not include blend data at the object edge (e.g., hard edges), the object border often contains detail that requires tedious effort to define manually, making the removal of the object difficult. Objects that include hair or fur present a combination of these problems. These types of objects have complex shapes and typically include regions with thin fibers that result in color blending.

In general, the problem does not have a simple unambiguous solution. The movie industry has adopted a solution that includes simplifying the scene, filming objects or people against a simple background (e.g., a blue screen) having a uniform color. However, even with simplified scenes, the removal of the background from complex objects remains a difficult process.

Techniques have been developed to produce approximate solutions. A software mask can be applied to an object to clip the object from the background. However, a haloing effect at the edge of the object will often result. The haloing effect can be minimized by manually tracing an object outline and closely cropping the mask to the outline, but the solution is tedious for complex objects, such as objects with hair. Alternatively, the mask can be sized to clip a portion of the foreground image away to remove pixels that include blend data. Neither of these solutions is satisfactory.

Another solution is to erase the undesirable portions of the image. There are various techniques for processing a raster image to erase components of the image. A common technique is to use a brush that is sized as one or more pixels in one or more dimensions. By positioning the brush over the image, the pixels that are covered by the brush are erased by one of two conventional erasing techniques. In a first technique, the erased colors are replaced with a background color. In a second technique, colors are effectively erased by driving their alpha values toward zero (where a full erasure occurs if the alpha channel value is set to zero).

Both of these techniques are effective for removing an undesirable portion of an image. However, the techniques also require tedious manual manipulations when operating on complex objects. In addition, conventional erasure techniques will not produce the correct original colors for pixels at object edges that include blend data. In the first technique, pixels that are part of an object edge and include blend data can either be erased completely (substituting a background color) or left un-erased. In either case, the results are similar to the haloing or close cropping problems described above. In the second technique, the color for blend pixels is unaffected, again resulting in undesirable results.

Transparency is a visual blending effect obtained when a background object (image, text, lines or filled regions) is partially obscured by a foreground object that is drawn over the background object. Numerous other blending effects may be used to integrate foreground and background graphics data. Examples of blending effects include a drop shadow effect, a screen effect, darker and lighter effects and overprinting effects.

A common task in the manipulation of digital images is the removal of a background object from a transparent foreground object. The transparent nature of the foreground object results in a combination of the foreground object blending with one or more background objects in the scene. In this example, the entire foreground object is a blend. It is difficult to erase one without erasing parts of the other. Typically, a conventional erasure algorithm is provided for erasing the background feature where alpha values that reflect the portion of the foreground element are extracted. However, even if the alpha values that reflect the amount of the foreground element that was present in the initial image are extracted, the color values remain a blend of the foreground and background features.

SUMMARY OF THE INVENTION

In one aspect, the invention provides a method for erasing a feature from a digital image and includes identifying a plurality of tip regions on the image each including multiple pixels of the image and each covering a portion of the feature and sequentially processing the tip regions to erase the feature. The sequential processing includes determining an erasure color, defining a color match function for the tip region, applying the color match function to each pixel in the tip region including determining a color match value for each pixel and completely erasing ones of the pixels in the tip region that have a color match value greater than a threshold value. For a pixel having a color match value less than the threshold, an erasure function is applied to the target pixel. A contribution of the erasure color is removed from a color associated with the target pixel where the effect of each action of processing a tip region is recorded in the digital image before any subsequent action of processing a tip region is performed.

Aspects of the invention include numerous features. The method can include applying a stroke using a brush to the digital image to designate a portion of the digital image for processing. The step of determining an erasure color can include sampling a color at a center region of a current brush tip of the brush stroke. The step of determining an erasure color can include sampling a color at a beginning of a brush stroke. The step of determining a background color can designate a fixed color for the erasure color.

The method can include adjusting a shape of the brush to size a tip region such that the stroke includes a portion of a boundary defining the intersection of the foreground and the background images. The shape of the brush can be a circle and the step of adjusting the shape for the brush can include varying a radius of the circle.

The step of erasing can include changing alpha values associated with a given pixel. The step of determining a color match value can include determining a difference between the erasure color and the color of the target pixel and applying a function to the difference. The function can be a tent function.

The method can include pinning the color match value to reflect colors available in a color space for the digital image. The threshold can be adjustable at each tip application. The color match value can be adjusted by a density value for the brush. The color match value can be reduced by a scaling factor proportional to a distance of the given target pixel from a center of a tip region.

The color match value at a target pixel can be driven to a minimum value if a target pixel between the current target pixel and a center of a tip region has color match value that is the minimum value. The color match value at a target pixel can be driven to a minimum value if all paths between a center of a tip application region and the target pixel include a pixel with a color match value that is the minimum value.

The image includes data in a plurality of color planes and a color match value is determined for each color plane. A minimum color match value for all the color planes can be used to determine whether or not a target pixel is completely or partially erased.

The erasure color and the color of a target pixel can include alpha channel values. The method can include determining a color match value from the alpha channel values.

The color values of the erasure color and the target pixels can be in a first color space. The method can include changing color values for the erasure color and the color of the target pixel to a second different color space prior to determining a color match value. The method can include changing color values for the erasure color and the color of the target pixel to a second different color space prior to removing a contribution of a background color.

The method can include changing color values for the erasure color and the color of the target pixel to a second different color space prior to determining a color match value and where the step of removing a contribution of a background color includes converting the decontaminated color values back to the first color space. The erasure color can be a background color.

In another aspect the invention provides a method for erasing a feature from a digital image and includes identifying a plurality of tip regions on the digital image each covering a portion of the feature, defining an erasure color, the erasure color being variable and potentially changing with each tip region and processing the tip regions to erase the feature. The step of processing the tip regions includes determining an erasure color for the tip region, applying an erasure function to each pixel in the region to remove the feature from the pixel and decontaminating each pixel in the region including removing a contribution of the erasure color from the pixel color if the pixel color is distinct from the erasure color.

In another aspect, the invention provides a method for erasing a feature from a digital image and includes identifying a plurality of tip regions on the digital image each covering a portion of the feature, defining a color match function to be applied to pixels in a tip region, the color match function being variable and potentially changing with each tip region and processing the tip regions to erase the feature. The processing includes determining an erasure color for the tip region, applying an erasure function to each pixel in the region to remove the feature from the pixel and decontaminating each pixel in the region including applying the color match function for the tip region to the pixel to remove a contribution of the erasure color from the pixel color if the pixel color is distinct from the erasure color.

In another aspect, the invention provides a method for erasing a feature from a digital image and includes identifying a plurality of tip legions on the digital image each covering a portion of the feature to be erased and processing the tip regions sequentially to erase the feature. The processing includes applying an erasure function to each pixel in the region to remove the feature from a target pixel where the action of applying the erasure function is given effect in the image before subsequent tip regions are processed and decontaminating each pixel in the region including removing a contribution of an erasure color from the pixel color if the pixel color is distinct from the erasure color.

Aspects of the invention can include numerous features. The step of applying the erasure function can include applying the erasure function at 100 percent to all pixels in the region having a color approximately equal to the erasure color, determining a color difference for all remaining pixels in the region and applying the erasure function at zero percent to all pixels having a color difference above a threshold value.

In another aspect, the invention provides a user interface method for processing a digital image and includes providing an erasure brush, applying the erasure brush in a stroke along a user-defined path covering a portion of a feature to be erased, selecting an erasure color at each tip application of the erasure brush as the erasure brush moves along the path and, at each tip application, invoking an erasing engine. The erasing engine applies a color match function to pixels lying within a tip region defined by the tip application, completely erases ones of the pixels in the tip region having a color that is approximately equivalent to the erasure color for the tip application, partially erases remaining ones of the pixels in the tip region having a color distinct from the erasure color, and decontaminates the color of partially erased pixels including removing a contribution of the erasure color from a color associated with the partially erased pixel.

Aspects of the invention include numerous features. The erasure brush can include a user adjustable geometry for defining a number of pixels enclosed in a tip region. The method can include configuring the erasure brush in response to a user input to define the geometry of the tip region processed at each tip application.

In another aspect, the invention provides a user interface for processing a digital image. The digital image includes a plurality of features represented by raster data. The user interface is manipulatable by a user to cause the removal of a feature from the digital image. The user interface includes a user adjustable brush defining a tip region for use in identifying a region of the digital image to process. The brush has a user specified shape. A means for adjusting the shape of the brush in accordance with user input is included. Additionally, means for moving the brush along a user defined path, means for selecting an erasure color at each tip application of the brush as the brush moves along the path and means for invoking an erasing engine at each tip application are included. The erasing engine applies a color match function to pixels lying within a tip region defined by a tip application, completely erases ones of the pixels in the tip region having a color that is approximately equivalent to the erasure color for a given tip application, partially erases remaining ones of the pixels having a color distinct from the erasure color, and decontaminates the color of a given pixel including removing a contribution of the erasure color from a color associated with a partially erased pixel.

Advantageous implementations of the present invention can include one or more of the following advantages. Background objects can be extracted from complex objects in complex scenes. A user interface is provided that enables quick and simple selection of an object to be erased. The user has the flexibility to highlight only those portions of the object that need to be erased. The user also has the flexibility to modify the brush geometry to capture the portion of the digital image that needs to be erased. Background objects of digital images can be extracted with high accuracy. The background surrounding a complex foreground object can easily be erased while avoiding halos of the background color in the edge pixels.

These and other advantages of the present invention will become apparent from the following description and from the claims.

BRIEF DESCRIPTION OF THE DRAWING

FIG. 1 is a schematic block diagram for a computer system for erasing a portion of a digital image.

FIG. 2 is a flow diagram for a process of erasing a feature of a digital image.

FIG. 3a is a sketch of a color match function.

FIG. 3b is a sketch of a color match function that includes a tolerance band.

FIG. 3c is a sketch of a color match function for an alpha channel of color data.

FIG. 4 shows a digital image presented in a user interface after the removal of a portion of a feature.

DETAILED DESCRIPTION

It is common for one working with digital images to erase objects from the image. The user selects an object to remove from a scene by outlining its boundary. However, this outline covers pixels whose origins are difficult to ascertain (are they a portion of the foreground or background, part of the desired feature or not). The present invention provides a solution to this problem that includes erasing pixels whose origins are uncertain and simultaneously extracting background color data from the erased pixels.

A number of terms are used herein to describe images and related structures. "Digital image," is used to refer to a collection of digital information that may be cast into the form of an image. The term image is used to describe a type of visual representation or object type. Digital images may include photographs, artwork, documents, and web pages, for example. Images may be obtained from digital cameras, digital video, scanners, and facsimile devices, for example. The images may be two-dimensional or of higher dimensionality. For example, three-dimensional images may include representations of three dimensional space or of two dimensional movies where the third dimension is time.

"Pixel" refers to an element of a digital image which has a specific location in the image and contains color information for that location. A pixel is a single picture element of a displayed visual representation. Each pixel is composed of one or more components, one for each component color (e.g., cyan, magenta, yellow and black) used in a particular color system. Each component, in turn, uses one or more bits to represent a gray scale value.

"Bitmap" refers to bits stored in digital memory in a data structure that represents the pixels. As used herein, "bitmap" can refer to both a data structure for outputting black and white pixels, where each pixel either is on or off, and a "pixel map" having more information for each pixel, such as for color or gray scale displays. The pixels of a bitmap are stored in "raster" order, as a collection of scanlines ordered, say from top to bottom, where the pixels of each scanline are ordered, say from left to right.

"Raster," as used herein, refers to the arrangement of pixels on an output device that creates a visual representation by displaying an array of pixels arranged in rows and columns. Raster output devices thus include computer displays, video displays, and LCD displays.

"Compositing" refers to the process of blending two images, for example, the overlaying of a cutout object image onto a new background image scene.

"Color" is used to represent a vector of values which characterizes all of the image information at a pixel. It could represent red, green and blue intensities in an RGB color space or a single luminosity in a gray scale color space. It may in addition represent the amount of transparency or translucence associated with the particular portion of the digital image. The color information associated with a pixel may include alpha channel values. The alpha channel defines the level of transparency for the pixel. The level of transparency ranges from completely transparent (erased) to opaque.

"Intrinsic color" color refers to the color in any given pixel in an image that an object in the image would present were it not blended with the background or another object. For pixels that are not blended, this is the observed color. For pixels that are blended, this is a color that differs from the observed color.

"Color extraction" or "decontamination" refer to the process of determining an intrinsic color for each pixel which makes up an object in a digital image. The intrinsic color may differ from the observed color because of blending of features (for example, foreground and background layers) into one pixel area during the imaging process. Another cause of color difference is the partial transmission of the background through a transparent or translucent foreground object (background bleed through).

"Color match values," as used herein, refer to a set of values, one or more for each pixel in a digital image, which indicate the degree to which the color of a pixel matches a predefined color. The predefined color can be a background color, a foreground color, a user defined color or other color (sampled, statistically derived or otherwise designated) that is used in both the erasure and decontamination process described below. In one implementation, the color match process does not compare the color of a target pixel to a specific color; rather, it decides how closely the color of the target pixel matches a predefined statistical profile for background or foreground colors in deriving the color match value. A color match value of "one" indicates that the pixel matches the color completely. A value of zero indicates that the color match is beyond a defined tolerance. Values between zero and one indicate partial color match in both features.

"Brush" refers to a user configurable tool for defining a stroke. The brush stroke includes a series of tip applications. A tip application defines a tip region that includes a plurality of pixels contained within a geometry defined for the brush. The geometry of the brush includes one or more user selectable parameters and a center. In the present specification, "brush" generally refers to an erasure brush.

In FIG. 1, a computer system 10 suitable for removing features from a digital image includes one or more digital computers 12, a communications bus 14 and an output display device.

Digital computer 12 can be a personal computer or a workstation. Digital computer 12 typically includes a microprocessor 20, a memory bus, random access memory (RAM) 21, read only memory (ROM) 22, peripherals such as input devices (e.g., keyboard, pointing device), and storage devices (e.g., floppy disk drive, hard disk drive). The storage devices typically include an operating system and one or more applications including an application 30 erasing a feature in a digital image. Alternatively, application 30 can be stored on other media, such as floppy disk 11.

The output display device can be a display, or other output device. Other output display devices include printers, projection devices, and plotters. For the purposes of this disclosure, reference will be made to a display 16.

Display 16 is an output display device that can produce a visual representation of an image on a screen.

The process of the present invention, as described below, provides a technique for manipulating digital images so that features can be removed.

FIG. 2 is a flow chart of user and program steps for erasing a feature from a digital image. The process begins by applying a brush stroke using an erasure brush tool over the area to be erased (52). The tool is described in greater detail below in association with the user interface. The brush stroke includes a series of tip applications over a user-defined path that is to be erased. Each tip application defines a tip region for processing. For each tip application, a process of color matching, erasing and simultaneously decontaminating color data for the portion of the image enclosed within the tip region is performed. More specifically, for a given tip application of the brush (54), an erasure color is determined (56).

The erasure color can be a background color. For example, a background color is selected when erasing a background object from a foreground object or the background scene from an object. Alternatively, a color to not erase, a "keep" color, can be selected. For example, where an object or feature includes a consistent or distinct color, it can be easier to designate the color of the object that is to be kept as opposed to the color of the feature (e.g., the background) that is to be erased. In one implementation, both an erasure color and a keep color can be defined. The erasure color is used in the decontamination process, while the keep color can be used in evaluating which pixels to erase. The erasure color and keep color can be determined by sampling a current color at the center of the brush on the target image (e.g., sampling the color at the center of the brush at the beginning of the brush stroke (i.e., before any erasing has occurred) or sampling the color at the center of the brush at the beginning of each tip application (tip erasure)). Alternatively, the erasure color or keep color can be determined by sampling pixels in a particular area of the tip region or can be otherwise specified by the user.

In one implementation, a fixed color can be designated for the entire erasure process. In another implementation, the erasure color is identified at each tip application.

A check is made to determine whether the color cannot be determined (58). For example, the color may not be able to be determined due to the erasure of pixels previously processed in another tip region (i.e., potential sample locations have fully transparent alpha channel values). If no erasure color can be determined, the process continues by checking to determine if the brush stroke has ended (60). If the brush stroke has ended, then the process terminates, or else a next tip region is processed (64).

Assuming that an erasure color is identified, then the process continues at step 66 in which a color match function is applied to each pixel in the tip region. Inputs to the color match function include the color of a current target pixel and the erasure color. The color match function produces as an output a color match value that is indicative of the degree that the color associated with a given pixel matches the erasure color. In one implementation, the color match value ranges from 0.0 to 1.0 inclusive. The match value can depend on one or more other parameters including a tolerance parameter. The tolerance parameter defines a measure of color at which a match condition (partial or complete) will arise. The color match value is derived as a function of the difference between the current target image color and the current erasure color. The function may be of the form of a tent function 300 where the peak 302 of the function is set to the value of the erasure color as is shown in FIG. 3a. A tolerance parameter can be applied on each side of peak 302 defining a region 308 over which the color match value ranges from a match condition (value of 1.0) to a non-match condition (value of zero). In one implementation, the tolerance varies as a function of pressure determined by a pressure value produced by a pressure sensitive stylus at each tip application.

In another implementation, a second tolerance can be included that forms a band 310 in proximity to peak 302 as shown in FIG. 3b. Pixels having color values falling within band 310 are deemed to be identical to the erasure color and as such, a color match value of 1.0 is output by the color match function for these pixels.

Using the color match values, a feature can be erased from the image. The color match values are used to derive new target data for each pixel within the tip application region. Each pixel of the target image included in the tip region is erased (68) and decontaminated (70). The processes of erasure and decontamination are described in greater detail below. In one implementation, the erasure and decontamination processes are performed simultaneously. After the erasure and decontamination steps are invoked, new pixel color data that is free of the erased feature is stored (72) and the process continues at step 60.

Erasure Process

Erasure step 60 includes several individual steps. An erasure function is defined for erasing pixels in the tip region. Pixels having a color that matches the erasure color (having a color match value that is equal to one) are completely erased (alpha channel values are set to zero). Pixels that partially match shaving a color match value that is between zero and one) are partially erased (alpha values are driven toward zero). Pixels that do not match the erasure color are not erased. The erasure function can be weighted or optimized as will be described in greater detail below. The erasure function operates on each pixel covered by the brush tip erasing in whole or part the pixel. The erasure function is applied at 100 percent to pixels having color data that matches the erasure color and at zero percent to pixels having a color that is distinct from the erasure color (outside a tolerance range). As described above, the tolerance level can be adjustable and vary at each tip application. The tolerance level is introduced into the color match function, and as such no separate tolerance is required to be applied at the erasure step. In one simple implementation, the erasure function adjusts the alpha values associated with a target pixel according to the formula:

$$T\_\text{new alpha} = T\_\text{old alpha} * (1-E); \text{ where}$$

T_new alpha is the new alpha data for the pixel,
T_old alpha is the old alpha data for the pixel, and
E is equal to the color match value for the pixel.

Decontamination Process

The color of the pixels is adjusted by the decontamination process set forth in step 70. More specifically, decontamination step 70 compensates for the blend of color data present in the target pixel color that represents a mixture of the color of a desired object (the intrinsic color) and the color of the feature being erased (e.g., a mixture of foreground color and background color). The intrinsic color for the object is the color that is desired to be extracted from the original target color data. In general, the intrinsic color or new color is defined according to the following formula:

$$T\_newcolorvalue=[T\_oldcolorvalue-ErasureColor*E]/(1-E); \text{ where}$$

T_newcolorvalue is equal to the new color data,
T_oldcolorvalue is equal to the target pixel color,
ErasureColor is equal to the color to be erased, and
E is equal to the color match value for the pixel.

In one implementation, the resultant color value (T_newcolorvalue) is pinned to a range of colors for the color component defined for the color space of the image. In general, the resultant color may be required to be pinned to the range of the representable colors. In one implementation, the pinning can be performed for each color component. More complicated pinning operations can be used that attempt to preserve hue or stay on a line between the old color value and the erasure color. An arbitrary result may be defined when the color match value is equal to one since the resulting alpha value for the pixel will be set to zero.

In one implementation, the process is a cumulative operation where pixel color data is manipulated at each tip application and stored. The new erased pixel color data can have an effect on erasure operations for subsequent tip applications processed during the same brush stroke. The cumulative process can provide better results than a batch process over the entire stroke.

User Interface

A digital image 400 presented through the user interface of the application is shown in FIG. 4. A user manipulatable tool is provided for highlighting a region to be erased. The tool can be user configurable. The tool can include a configurable geometry defining different types of brush "heads" that can be used in the erasure process. Parameters of the tool can also be adjusted. For example, with a circular brush tool, the user can adjust the radius of the tool defining the size of the circular tip region that is processed during the erasure and decontamination steps. Other geometries can be included for the brush tip region including ones defined by a series of Bezier curves forming a closed bounding region.

The tool can be manipulated by a user to define a stroke over a region desired to be erased. The region can define the interface between two objects (e.g., the flower 401 and the feature including the darkened region indicated at 402), an object and the background, or an entire object that has background bleed-through. As the user brushes a stroke (including tip applications 404*a-e*) across digital image 400, the simultaneous erasure and decontamination processes are applied to the color data at each tip application 404*a-e*. A color match function is applied to the pixels within the tip application region and pixels are erased and decontaminated in accordance with the processes described above. In the digital image shown, when the alpha values for the feature indicated at 402 are erased in a tip region, an underlying layer of pixel information is uncovered (the banded region which in this case lies in a layer just beneath feature 402). Digital image 400 shows the cumulative effect of processing pixel data after tip applications 404*a*, 404*b*, 404*c* and 404*d*. Each of these show tip regions having pixel data that has been transformed in accordance with the erasure and decontamination processes described above, uncovering pixel data that includes the bands shown. Tip region 404*e*, the current or last tip region in the stroke shown, has yet to be processed.

Alternative Implementations

The color match can be performed in a first color space while the decontamination process can be performed in a different second color space. For example, the color match can be performed in a color space that emphasizes visual uniformity while the decontamination process can be performed in a second color space that emphasizes color linearity. The color data can be transformed to different color space (for example, from the RGB color space to CIE (Commission International de l'Eclairage) L*a*b* color space) prior to invoking either of the color match or decontamination process steps. The transformation can be temporary, only for the purposes of processing the given step, and a conversion back to the original color space may be required before further processing or final output of the color data to the output display device.

The color match value can be further processed prior to invoking the erasure or decontamination step. The further processing can be used to soften the brush stroke or enforce a contiguity constraint. The brush stroke can be softened by applying a scaling function to the color match value. In one implementation, the color match value is scaled by the brush density for the brush. Brush density values can be used to provide a shape to the brush and define a transition across the brush region. A soft edge brush includes a transition from the center to the periphery of the brush. For this type of brush tool, the application of the erasure and decontamination processes an also be scaled to erase only the appropriate portion of the color data (maximum erasure at the center of the brush transitioning to a minimum erasure at the periphery of the brush tip region). In one implementation, the density values are used to limit rather than scale the color match values. When scaled, the color match value is multiplied by the brush density. When limited, the color match value is clamped to the brush density. The limiting case is described in more detail below with regard to evaluating alpha channel color match values.

Similarly, a contiguity constraint can be enforced so that once a hard transition (edge) is reached, no further erasing is allowed. This type of further processing prevents the erasure of interior features of an object, once the edge of the object is located. For contiguity enforcement, the color match value at a target pixel is driven to a minimum value if all paths between a center of a tip application region and the target pixel include a pixel with a color match value that is the minimum value. A convexity limitation can also be applied where the color match value at a target pixel is driven to a minimum value if a target pixel between the current target pixel and a center of a tip region has color match value that is the minimum value.

The color match value can also be scaled or limited to compensate for transparent images. The color match function can consider alpha values when evaluating the color difference between the erasure color and the target pixel color data. Low alpha channel values in the target pixel indicate transparency and can be used to scale the resultant color match value. In one implementation, if the target pixel(s) used for determining the erasure color are highly transparent, the system reduces the color match values for pixels that are significantly more opaque than the target pixel.

In one implementation, a color match value is calculated for each color component. For example, a pixel can include 24 bit deep data, having 8 bits for each of three color planes when the image is represented in the RGB color space. The process can calculate color match values using the color match function in each color plane. Thereafter, one of the color match values (the minimum value) can be selected, or a statistical method can be applied to the color match values to produce a single color match value for the pixel. In one implementation, the color match values are averaged and the average match value is used in further processing for the pixel.

In one implementation, the color data includes alpha channel data, which can also be processed and evaluated to determine a color match value in the alpha channel "plane". Again, various processes can be used to select the single color match value used for further processing of the pixel.

The color match function applied to the individual color planes can be optimized or weighted differently for each color plane or the alpha channel. For example, the alpha channel can be weighted to produce a higher occurrence of a match when the alpha values are low (highly transparent pixel) so as to minimize the effect of the alpha channel in the derivation of the single color match value for the pixel. A color match function that can be applied to the alpha channel is shown in FIG. 3c. The application of different functions to different color planes can compensate for perceptual differences in color as opposed to actual color differences.

As described above, the erasure color can be the color that is associated with a feature to be erased. Alternatively, the erasure color and a keep color can be designated. Either of the keep color or the erasure color can be used in the erasure process. In the color decontamination step, the erasure color is used to decontaminate the color data for a given pixel. Alternatively, only a keep color can be designated. If only a keep color is designated, then the process changes minimally. The erasure step changes only in that the erasure function is applied at 100% at a match value of 0, and 0% at a match value of 1 when matching to the keep color. The decontaminated color for pixels in a tip region can be derived in a number of ways. The decontaminated color can be set to the keep color; however, artifacts at the boundary between pixels may be presented. An erasure color can be calculated (the background or feature color for the feature that is to be erased) using the decontamination algorithm, pinning it, and then solving for the new color. For example, the erasure color can be calculated according to the formula:

ErasureColor=(OldColor−KeepColor*(1−$E$))/$E$, while the new color can be calculated according to, NewColor=(OldColor−$E$*ErasureColor)/(1−$E$); where $E$ in both formulas represents a color match value with respect to a color to be erased.

The color match function takes a target image pixel and generates a value between 0 and 1 describing how closely this value matches the "background"—i.e., the area to be erased. One simple color match function is parameterized by a background color and a tolerance value, producing one or more tent functions to be applied to each color component as described above. The function can vary with each tip application (tip hit) by varying the values for the background color (erasure color) and/or the tolerance value. The function can be made more generous by using a different shape than a strict tent. For example, a cap width as shown in FIG. 3b can be defined.

The erasure color can be determined by evaluating at just the center pixel in the brush or at a central region, taking for example an average. Taking an average over a central region possibly as small as 3×3 pixels) helps compensate for noise.

The tolerance and cap radius can each depend on user controlled settings. They can also depend on a source of varying input information during the stroke, such as the value from a pressure sensitive stylus. Such values can be combined—generally by multiplication.

Values within a central region of the brush can be evaluated to calculate statistics such as standard deviation to adjust the tolerance and/or cap radius. For example, if the background appears noisy within this central region, a larger cap radius or tolerance can be defined for more generosity in the matching process.

Color matching functions can be constructed that attempt to avoid a foreground color. This is generally achieved by adjusting one or more of the functions to make sure that the function goes to zero at the corresponding component of the foreground color.

Color match functions can be constructed that look at more than just the straight color components. For example, in addition to looking at red, green, and blue, the function can look at the crosswise differences red–green, green–blue, and blue–red. The crosswise differences cover a greater range than the raw component values. A matching function can be constructed using a Euclidean distance within the color space. The per component and crosswise difference approaches are approximations of this type of function.

As described above, the color match function can be pinned to avoid forcing the decontamination step to deal with out-of-range colors. The color matching value can include restrictions to avoid excessive pinning during the decontamination process. The maximum value can be adjusted to avoid pinning. More specifically, if a color is known to be a mixture of background color and foreground color and the foreground color is known to lie within the range of legal colors, then the color match function can be configured not to report a stronger match than the largest possible mixture of foreground to background. The effect of this is to force a color match function toward zero at the extremes of each component's legal range, assuming this extremal value does not actually match the background color.

Pinning at the color match stage proves to be of limited value because it makes it hard to match nearly identical colors with components near the extremal points of a component range. For example, if the background color is 254, 254, 254, a pinned color match function would have to report a match value of 0 for 255, 255, 255 since there is no legal color one could combine with 254, 254, 254 to get 255, 255, 255.

Statistical analyses can be performed on the entire brush region. If there are sufficiently distinguished foreground and background elements, a bimodal or multimodal distribution of colors can be identified. The background color should fall within one of these distributions. The matching function can then be produced based on Bayesian probability to report a probability that a given color was part of the background.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method for erasing a feature from a digital image, comprising:

identifying a plurality of tip regions on the digital image each covering a portion of the feature to be erased;

processing each tip region sequentially to erase the feature including:
applying an erasure function to each contiguous target pixel in the tip region to remove the feature from a target pixel, and
decontaminating each contiguous target pixel in the region including removing a contribution of an erasure color from each contiguous target pixel's color if the contiguous target pixel's color is distinct from the erasure color; and
wherein processing is preformed by one or more computers.

2. The method of claim 1 where the target pixel is contiguous if at least one path in the tip region between the target pixel and a center of the tip region includes a pixel with a color match value that is not a minimum value.

3. The method of claim 1 where a target pixel is contiguous if the target pixel and a center of the tip region lie on same side of an edge in the region.

4. The method of claim 1 where applying the erasure function comprises:
applying the erasure function to all contiguous target pixels in the tip region that have a color approximately equal to the erasure color.

5. The method of claim 1 where applying the erasure function comprises:
applying the erasure function at 100 percent to all contiguous target pixels in the tip region having a color approximately equal to the erasure color; and
determining a color difference for all remaining contiguous target pixels in the region and applying the erasure function at zero percent to all pixels having a color difference above a threshold value.

6. The method of claim 1, further comprising:
applying a stroke using a brush to the digital image to designate a portion of the digital image for processing.

7. The method of claim 6, further comprising:
determining the erasure color by sampling a color at a center region of a current brush tip of the brush stroke.

8. The method of claim 6, further comprising:
determining the erasure color by sampling a color at a beginning of the brush stroke.

9. The method of claim 1 where the action of applying the erasure function is given effect in the image before subsequent tip regions are processed.

10. A computer program product, encoded on a computer-readable medium, operable to cause one or more processors to perform operations comprising:
identifying a plurality of tip regions on the digital image each covering a portion of the feature to be erased; and
processing each tip region sequentially to erase the feature including:
applying an erasure function to each contiguous target pixel in the tip region to remove the feature from a target pixel, and
decontaminating each contiguous target pixel in the region including removing a contribution of an erasure color from each contiguous target pixel's color if the contiguous target pixel's color is distinct from the erasure color.

11. The program product of claim 10 where the target pixel is contiguous if at least one path in the tip region between the target pixel and a center of the tip region includes a pixel with a color match value that is not a minimum value.

12. The program product of claim 10 where a target pixel is contiguous if the target pixel and a center of the tip region lie on same side of an edge in the region.

13. The program product of claim 10 where applying the erasure function comprises:
applying the erasure function to all contiguous target pixels in the tip region that have a color approximately equal to the erasure color.

14. The program product of claim 10 where applying the erasure function comprises:
applying the erasure function at 100 percent to all contiguous target pixels in the tip region having a color approximately equal to the erasure color; and
determining a color difference for all remaining contiguous target pixels in the region and applying the erasure function at zero percent to all pixels having a color difference above a threshold value.

15. The program product of claim 10, further operable to cause the one or more processors to perform operations comprising:
applying a stroke using a brush to the digital image to designate a portion of the digital image for processing.

16. The program product of claim 15, further operable to cause the one or more processors to perform operations comprising:
determining the erasure color by sampling a color at a center region of a current brush tip of the brush stroke.

17. The program product of claim 15, further operable to cause the one or more processors to perform operations comprising:
determining the erasure color by sampling a color at a beginning of the brush stroke.

18. The system of claim 15 where the operations further comprise:
determining the erasure color by sampling a color at a center region of a current brush tip of the brush stroke.

19. The system of claim 15 where the operations further comprise:
determining the erasure color by sampling a color at a beginning of the brush stroke.

20. The program product of claim 10 where the action of applying the erasure function is given effect in the image before subsequent tip regions are processed.

21. A system comprising:
a display device;
a machine-readable storage device including a program product; and
one or more processors operable to execute the program product, interact with the display device, and perform operations comprising:
identifying a plurality of tip regions on the digital image each covering a portion of the feature to be erased; and
processing each tip region sequentially to erase the feature including:
applying an erasure function to each contiguous target pixel in the tip region to remove the feature from a target pixel, and
decontaminating each contiguous target pixel in the region including removing a contribution of an erasure color from each contiguous target pixel's color if the contiguous target pixel's color is distinct from the erasure color.

22. The system of claim 21 where the target pixel is contiguous if at least one path in the tip region between the target pixel and a center of the tip region includes a pixel with a color match value that is not a minimum value.

23. The system of claim 21 where a target pixel is contiguous if the target pixel and a center of the tip region lie on same side of an edge in the region.

24. The system of claim 21 where applying the erasure function comprises:
   applying the erasure function to all contiguous target pixels in the tip region that have a color approximately equal to the erasure color.

25. The system of claim 21 where applying the erasure function comprises:
   applying the erasure function at 100 percent to all contiguous target pixels in the tip region having a color approximately equal to the erasure color; and
   determining a color difference for all remaining contiguous target pixels in the region and applying the erasure function at zero percent to all pixels having a color difference above a threshold value.

26. The system of claim 21 where the operations further comprise:
   applying a stroke using a brush to the digital image to designate a portion of the digital image for processing.

27. The system of claim 21 where the action of applying the erasure function is given effect in the image before subsequent tip regions are processed.

* * * * *